United States Patent [19]

Felchlin

[11] 4,225,369
[45] Sep. 30, 1980

[54] METHOD OF SECURING SHEETS OR POSTER TO A BASE

[76] Inventor: Hermann Felchlin, Zürcherstrasse 1, 5200 Brugg-Windisch, Switzerland

[21] Appl. No.: 858,542

[22] Filed: Dec. 8, 1977

[30] Foreign Application Priority Data

Dec. 8, 1976 [CH] Switzerland ............... 15394/76

[51] Int. Cl.³ .................. B32B 31/04; B32B 31/20
[52] U.S. Cl. ................................ 156/71; 40/611; 40/615; 156/272; 156/290; 156/306.3; 156/306.6; 361/225; 361/231; 29/428; 29/458
[58] Field of Search .......... 156/272, 380, 290, 300, 156/60, 309, 71; 428/13, 14, 68, 922; 310/309, 310; 307/149; 40/5, 156, 158 R, 158 B, 372, 600, 618, 594, 595, 159, 611, 615

[56] References Cited
U.S. PATENT DOCUMENTS

| | | | |
|---|---|---|---|
| 2,598,755 | 6/1952 | Birch | 156/290 |
| 3,054,708 | 9/1962 | Steinberg | 156/272 |
| 3,462,909 | 8/1969 | Anderson | 156/272 |
| 3,522,673 | 8/1970 | Dudley | 40/158 R |
| 3,582,730 | 6/1971 | Teston | 156/272 |
| 3,679,512 | 7/1972 | Macone | 156/272 |
| 3,892,614 | 7/1975 | Levy | 156/272 |

Primary Examiner—Michael G. Wityshyn
Attorney, Agent, or Firm—Wender, Murase & White

[57] ABSTRACT

The present invention refers to a method of securing a sheet or a poster to a base, wherein the sheet or poster is brought into contact with at least one plastics material sheet and caused to adhere to said base by dampening said base or by wiping said base on the poster side with a means suitable for producing an electrostatic charge.

In one particular application two plastics material sheets joined together along one edge and folded along said edge so as to be superposed one on the other are utilized, said sheet or poster being placed between or on said superposed sheets, said superposed sheets being caused to adhere to one another by being wiped with means suitable for producing an electrostatic charge.

6 Claims, 4 Drawing Figures

U.S. Patent  Sep. 30, 1980  4,225,369
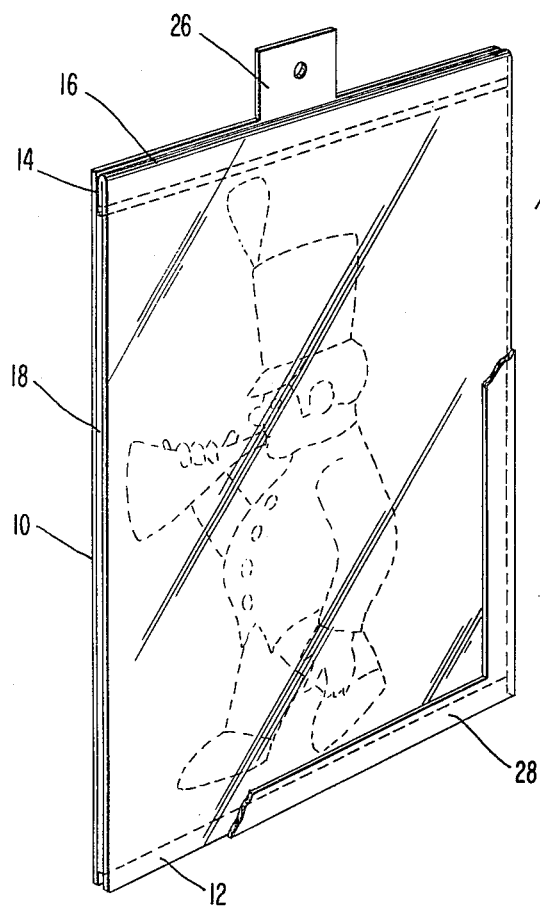
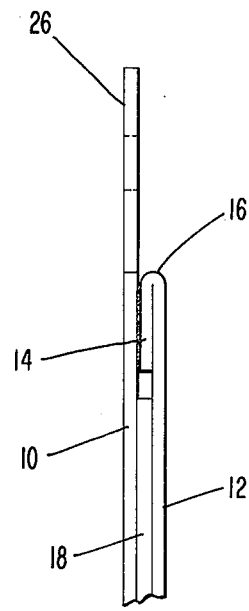
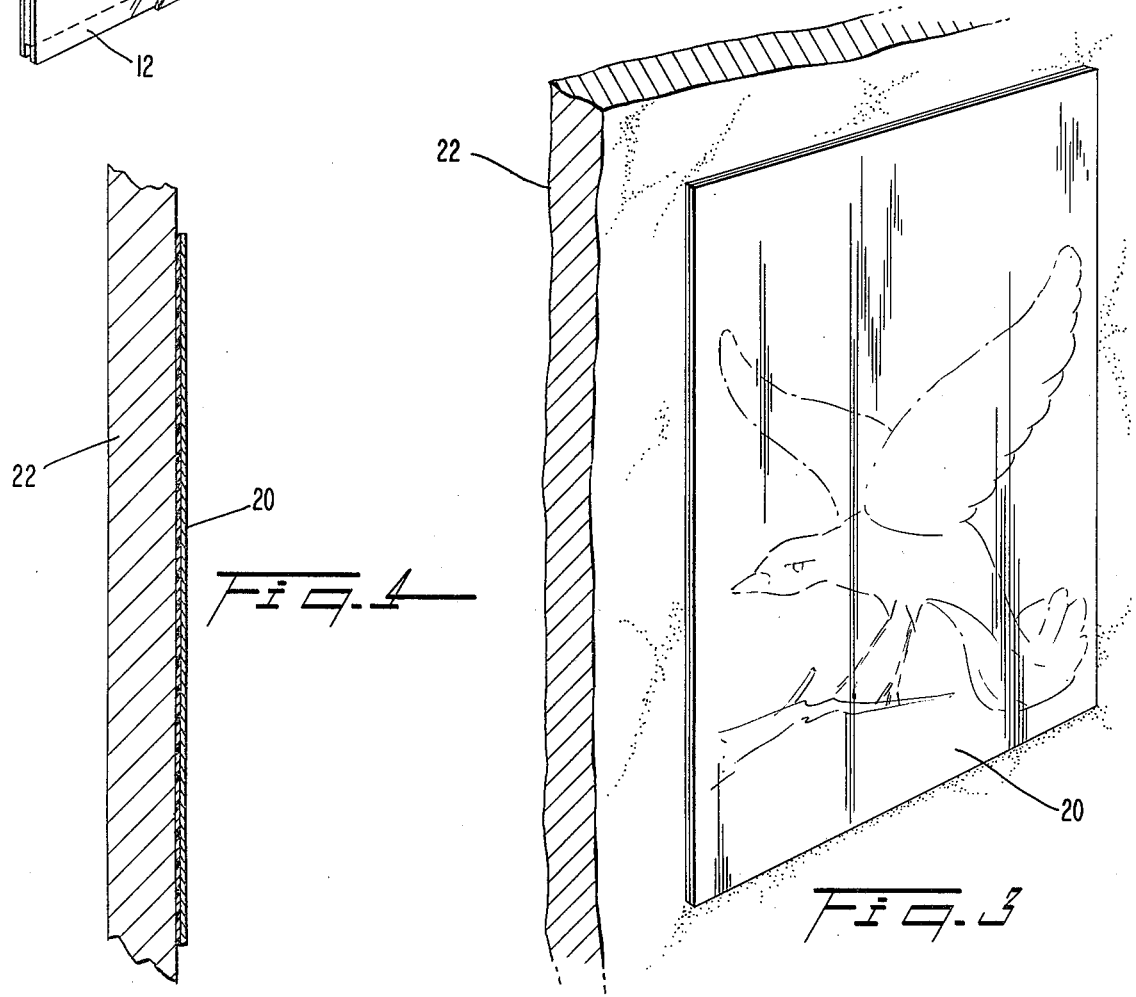

METHOD OF SECURING SHEETS OR POSTER TO A BASE

BACKGROUND OF THE INVENTION

The present invention relates to a method of securing pictures or posters to a base. Hitherto, pictures or posters have generally been secured to a base, such as a wall, by utilising drawing-pins, adhesives or adhesive tape. However, this often leads to damage of the picture or of the wall. The picture, especially if it is a large poster or placard, cannot always be replaced and damage to the wall or wall covering may be expensive to correct.

The present invention seeks to provide a method by means of which pictures or posters may be easily secured to a wall or base wall without risking damage to either the picture or poster or to the base. It is a subsidiary object of the invention to provide a method which permits the picture or poster to be replaced in a simple manner.

SUMMARY OF THE INVENTION

According to the present invention, there is provided a method of securing a sheet or a poster to a base wherein the sheet or poster is brought into contact with at least one plastics material sheet and caused to adhere to said base by dampening said base or by wiping said base on the poster side with means suitable for producing an electrostatic charge.

In one embodiment of the present invention two plastics material sheets joined together along one edge and folded along said edge so as to be superposed one on the other are utilised, said sheet or poster being placed between or on said superposed sheets, said superposed sheets being caused to adhere to one another by being wiped with means suitable for producing an electrostatic charge.

BRIEF DESCRIPTION OF THE DRAWINGS

FIG. 1 is a perspective front view of one embodiment of a poster secured to a base in accordance with the present invention;

FIG. 2 is a side view of the embodiment shown in FIG. 1;

FIG. 3 is a perspective front view of an alternative embodiment of a poster secured to a base according to the present invention; and FIG. 4 is a sectional side view of the alternative embodiment shown in FIG. 3.

DESCRIPTION OF THE PREFERRED EMBODIMENTS

In order to permit the picture 18 which may be a catalogue page, an advertising prospectus or a placard to be adhered to a wall, a plastics material backing sheet 20, preferably made of polyvinyl chloride (PVC) is secured to the reverse side thereof. The thickness of the PVC sheet depends upon the size of the sheet to be secured, the larger the sheet or poster, the thicker the sheet of PVC. The PVC sheet may be either adhered to or fused to the sheet to be secured. If an adhesive is used, it is preferable to use a so-called contact adhesive which is usually Neoprene-based. The whole surface may be coated with adhesive or, if desired, the adhesive may be provided in discrete areas. Fusing is expediently effected at the edges of the sheets, or in the form of a diamond-shaped lattice or at discrete spots. The fusion may, however, be effected at points which form a pattern such as letters, numerals or a drawing. This is particularly desirable if the fused or welded side is, in use, visible. This may occur if, for example, the picture or poster is to be displayed in a window.

Sheets coated in this manner may be permanently secured by wetting the base 22 to which the picture is to be applied. It then suffices for the sheet to be pressed against the base and smoothed over. Particularly suitable bases for such treatment are smooth surfaces such as varnished wood, plastics material coatings, painted iron surfaces, glass and fine-grained wall papers. If, however, the base has a rough texture, only temporary adhesion may be attained in this manner.

It is, however, also possible to cause coated sheets to adhere to a smooth base without the need for wetting if the sheets are pressed against the base and then are rubbed with a rag or the like to produce an electrostatic charge. It has thus been found that the electrostatic charging of the PVC sheet may best be carried out with the same material, whereby not the PVC sheet directly but the sheet having to be rubbed. It is thus expedient if the sheet utilised for the rubbing is in the shape of a pocket or bag or is in the shape of a glove. Thin, discardable PVC gloves which are readily obtainable are not suitable, but such may be welded or fused to a thicker PVC sheet.

It must, however, be stressed that the adhesion is produced not only by electrostatic forces, but also by the close contacting of the sheet or of the PVC sheet with the base. In contrast to the "damp adhesion", the "dry adhesion" has the advantage that the sheet can be moved around on the base but will still adhere thereto. It is, therefore apparent that dry adhesion is preferred wherever damp adhesion is either not possible or undesirable, for example, if the base is a wallpaper or delicate wood. It will also be apparent that sheets secured in this manner can be readily removed and that no traces of adhesion will remain on the base.

There may be various reasons why an alternative adhesion method is desired. Thus, the base may be unsuitable for utilising such a method, for example, it may be too rough or uneven. Moreover, it may not always be desirable to cover a relatively large poster with a PVC sheet, particularly if the posters or pictures being displayed are frequently interchanged or replaced. In such a case, two PVC sheets 10 and 12 approximately the size of the poster are connected together along one edge 14. These two sheets are secured with the top 16 of the connected edge facing upwards to the wall. The two sheets may, if required, or desired, be permanently secured together by utilising an adhesive cement. To mount the poster, it is merely necessary to slide the poster 18 between the two sheets and to wipe it with the PVC pocket or bag or glove, which causes the poster to firmly adhere between these sheets. This method of securing has the advantage that it is unnecessary to use a wall or the like as the base since a double-sheet arrangement may also be suspended freely by hanging means 26 from, for example, a ceiling. With such an arrangement, several variations are possible. For example, one or both sheets may be tinted or toned or may have a frame 28 or any other decoration mounted thereon. If, however, it is not desired to entirely cover the poster, it is still possible to cause it to adhere between the two sheets.

It is not essential to use a PVC sheet as the adhesive sheet, since all plastics material sheets, which may be of any suitable thickness and which may be electrostatically charged are suitable.

I claim:

1. A method of securing a poster to a wall so it is ready for display and secured in a manner so as to permit removal of the poster from the wall without causing damage to either the poster or the wall, comprising the steps of:

providing a transparent plastics material sheet;

bringing the poster into physical contact with said transparent plastics material sheet and affixing the poster thereto; and adhering said transparent plastics material sheet to the wall without application of heat by wiping the wall with a means suitable for producing an electrostatic charge, and then pressing said plastics material sheet against the wall, the poster affixed to said plastics material sheet being thus ready for display on the wall, the poster thereby being secured in a manner so as to permit removal of the poster from the wall without causing damage to either the poster or the wall.

2. A method as claimed in claim 1, wherein two transparent plastics material sheets joined together along one edge and folded along said edge so as to be superposed one on the other are utilized, said poster being slidably placed between said superposed sheets, said superposed sheets being caused to firmly adhere to one another by being wiped with said means suitable for producing an electrostatic charge.

3. A method as claimed in claim 1, in which said means for producing the electrostatic charge is made of the same material as said transparent plastics material sheet and is in the form of a pocket, bag or glove.

4. A method as claimed in claim 1, in which said transparent plastics material sheet is fused to the poster.

5. A method as claimed in claim 5, in which said transparent plastics material sheet is fused to said poster in discrete areas or at discrete points.

6. A method as claimed in claim 1, in which said transparent plastics material sheet is made of polyvinyl chloride.

* * * * *